United States Patent
Kim

(10) Patent No.: US 7,728,731 B2
(45) Date of Patent: Jun. 1, 2010

(54) APPARATUS AND METHOD FOR MODIFYING RFID TAG DATA IN PORTABLE TERMINAL

(75) Inventor: Ji-Hyun Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 911 days.

(21) Appl. No.: 11/542,074

(22) Filed: Oct. 3, 2006

(65) Prior Publication Data

US 2007/0096883 A1    May 3, 2007

(30) Foreign Application Priority Data

Nov. 3, 2005  (KR)  ...................... 10-2005-0104728

(51) Int. Cl.
*G60B 13/14* (2006.01)
(52) U.S. Cl. ............ 340/572.1; 340/539.1; 340/539.11; 340/825.69; 340/825.72; 340/10.1; 340/10.3; 340/10.51; 235/375; 235/385
(58) Field of Classification Search .............. 340/572.1, 340/539.1, 539.11, 825.69, 825.72, 10.1, 340/10.3, 10.51; 235/375, 376, 383, 385, 235/487, 492
See application file for complete search history.

(56) References Cited

U.S. PATENT DOCUMENTS

| 6,034,603 | A | 3/2000 | Steeves | |
|---|---|---|---|---|
| 7,274,292 | B2 * | 9/2007 | Velhal et al. | 340/539.32 |
| 2003/0095032 | A1 * | 5/2003 | Hoshino et al. | 340/5.92 |
| 2005/0093679 | A1 | 5/2005 | Zai et al. | |
| 2006/0103529 | A1 * | 5/2006 | Ohmura et al. | 340/568.1 |

FOREIGN PATENT DOCUMENTS

| CN | 1588386 | 3/2005 |
|---|---|---|
| WO | WO 01/82520 | 11/2001 |

* cited by examiner

*Primary Examiner*—Hung T. Nguyen
(74) *Attorney, Agent, or Firm*—The Farrell Law Firm, LLP

(57) ABSTRACT

An apparatus and method for modifying RFID tag data in a portable terminal are provided. The method includes determining whether a UID of the RFID reader is received; when the UID of the RFID reader is received, determining whether RFID tag data corresponding to the received UID exists in an RFID data management database; and when the RFID tag data corresponding to the received UID data exists in the RFID data management database, recording the corresponding data in the RFID tag and transmitting the recorded data. The data recorded in the RFID tag can be dynamically modified according to the RFID readers that are located near the portable terminal and collect the RFID tag data.

15 Claims, 2 Drawing Sheets

APPARATUS AND METHOD FOR MODIFYING RFID TAG DATA IN PORTABLE TERMINAL

PRIORITY

This application claims priority under 35 U.S.C. §119 to an application entitled "Apparatus And Method For Modifying RFID Tag Data In Portable Terminal" filed in the Korean Intellectual Property Office on Nov. 3, 2005 and assigned Ser. No. 2005-104728, the contents of which are incorporated herein by reference.

BACKGROUND OF THE INVENTION

1. Field of the Invention

The present invention relates generally to an apparatus and method for modifying a Radio Frequency Identification (RFID) tag data in a portable terminal, and in particular, to an apparatus and method for dynamically modifying RFID tag data using an RFID reader in a portable terminal.

2. Description of the Related Art

RFID tags, called smart tags, are one of automatic identification technologies using an ultraminiature chip that is built in a card and can store up to 6000 times more data than barcodes. Functions of RFID tags are similar to those of barcodes.

However, RFID tags can be identified simultaneously at a long distance. Because of these advantages, RFID tags are widely used in various fields such as product information management systems and Global Positioning Systems (GPSs).

Specifically, RFID tags are widely used in identification systems, such as entry authorization systems and locking systems, which operate specific devices. For example, in the case of an RFID-based electronic locking system, an electronic key and an electronic lock have an RFID tag and an RFID reader, respectively. When the electronic key and the electronic lock are matched with each other, the electronic lock is operated through the authentication of an electronic key data contained in the RFID tag.

As described above, the identification system with the RFID reader is operated using the data recorded in the RFID tag (also referred to as RFID tag data). However, because the RFID tag records data for one RFID reader, the user has to modify the RFID tag data so as to allow another RFID reader to operate with that RFID tag.

SUMMARY OF THE INVENTION

An object of the present invention is to substantially solve at least the above problems and/or disadvantages and to provide at least the advantages below. Accordingly, an object of the present invention is to provide an apparatus and method for modifying an RFID tag data in a portable terminal.

Another object of the present invention is to provide an apparatus and method for dynamically modifying an RFID tag data using unique identifications (UIDs) of RFID readers located near a portable terminal.

According to one aspect of the present invention, a method for modifying an RFID data in a portable terminal includes when an RFID tag is activated by identifying a signal generated from a specific RFID reader, determining whether a UID of the RFID reader is received; when the UID of the RFID reader is received, determining whether RFID tag data corresponding to the received UID exists in an RFID data management database; and when the RFID tag data corresponding to the received UID data exists in the RFID data management database, recording the corresponding data in the RFID tag and transmitting the recorded data.

According to another aspect of the present invention, an apparatus for modifying an RFID tag data in a portable terminal includes a database storing a plurality of RFID tag data corresponding to a plurality of RFID readers; a controller for reading, from the database, an RFID tag data corresponding to a UID received from a specific RFID reader, and recording the read RFID tag data in an internal memory of the RFID tag; and an RFID tag for transmitting the recorded RFID tag data to the RFID reader under control of the controller.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail because they would obscure the present invention in unnecessary detail.

Hereinafter, an apparatus and method for operating a plurality of RFID readers by dynamically modifying RFID tag data in a portable terminal will be described in detail.

Figure 1:
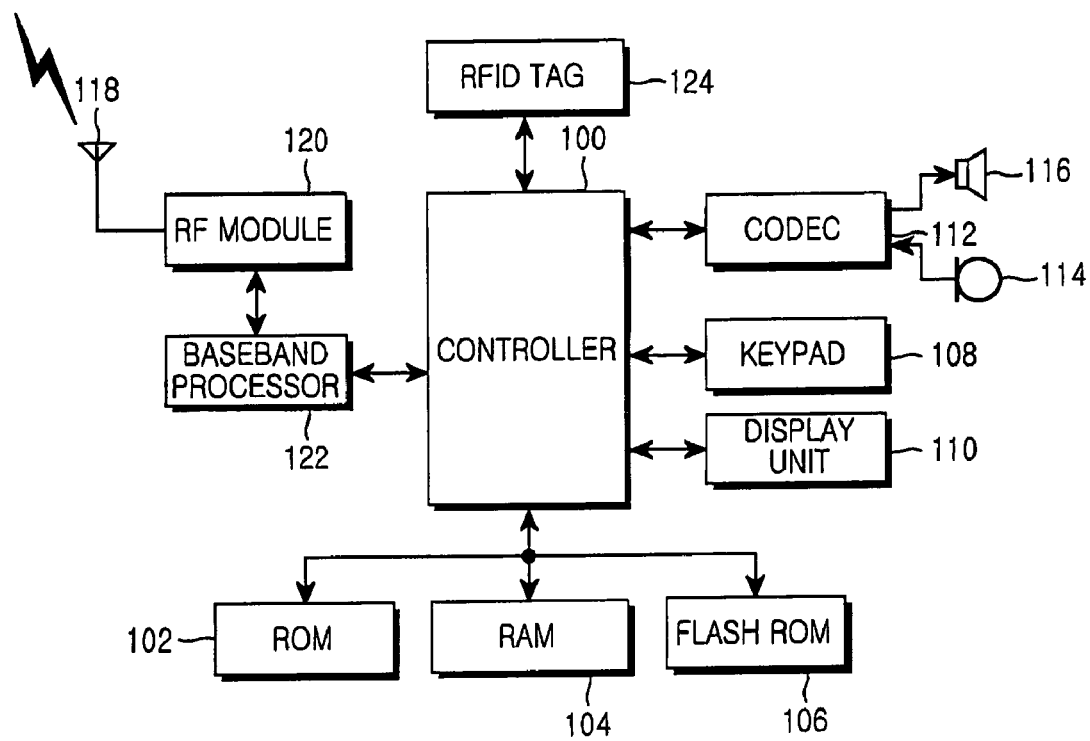
FIG. 1 illustrates a block diagram of a portable terminal according to the present invention.

FIG. 1 is a block diagram of a portable terminal according to the present invention. Examples of the portable terminal include Personal Communication System (PCS) terminals, Personal Data Assistants (PDAs), and International Mobile Telecommunication-2000 (IMT-2000) terminals. The following descriptions will be made with reference to a general structure of the above terminals.

Referring to FIG. 1, the portable terminal includes a controller (e.g., microprocessor unit (MPU)) 100, a Read Only Memory (ROM) 102, a Random Access Memory (RAM) 104, a flash ROM 106, a keypad 108, a display unit 110, a Coder-Decoder (CODEC) 112, a microphone 114, a speaker 116, an antenna 118, an RF module 120, a baseband processor 122, an RFID tag 124.

The controller 100 controls an overall operation of the portable terminal. For example, the controller 100 processes and controls voice communication and data communication. In addition to the general functions, the controller 100 of the present invention dynamically modifies RFID tag data according to unique identifications (UIDs) of RFID readers and then transmits the modified RFID tag data to the RFID reader. A detailed description of the general control operation of the controller 100 will be omitted for conciseness.

The ROM 102 stores a variety of reference data and microcodes of a program for the processing and controlling operations of the controller 100. Specifically, the ROM 102 stores a program for recording data, which allows the RFID reader to operate, in the RFID tag 124, and a program for enabling or disabling the data transmission function of the RFID tag 124. A RAM 104 is a working memory of the controller 100 that temporarily stores data generated during the execution of various programs. A flash ROM 106 stores a variety of updateable backup data such as phone book data, outgoing messages, and incoming messages. Specifically, the flash ROM 106 stores a table in which data for operating the RFID reader are recorded and it also stores a flag for enabling or disabling the data transmission function of the RFID tag 124.

The RFID tag 124 can manage information of various objects such as food, animals, and products wirelessly and can transmit data to an RFID reader having the same frequency as the RFID tag wirelessly. Specifically, the RFID tag 124 transmits data recorded in its internal memory to the RFID reader.

The keypad 108 includes numeric keys of digits 0-9 and a plurality of function keys, such as a Menu key, a Cancel (delete) key, a Confirmation key, a Talk key, an End key, an Internet connection key, Navigation keys (▲/▼/◀/▶), and character input keys. The keypad 108 provides the controller 100 with key input data corresponding to a key pressed by a user.

The display unit 110 displays status information generated during operations of the portable terminal, numerals and characters, moving pictures and still pictures, and so on. A color Liquid Crystal Display (LCD) may be used as the display unit 110.

A CODEC 112 is connected to the controller 100, and a microphone 114 and a speaker 116 are connected to the CODEC 112. The CODEC 112, the microphone 114, and the speaker 116 serve as a voice input/output block for telephone calling and voice recording. The CODEC 112 converts Pulse-Code Modulated (PCM) data provided from the controller 100 into analog audio signals, and the analog audio signals are outputted through the speaker 116. Also, the CODEC 112 converts audio signals received through the microphone 114 into PCM data and provides the PCM data to the controller 100.

The RF module 120 down-converts RF signals received through the antenna 118 and provides baseband signals to the baseband processor 122. Also, the RF module 120 up-converts the baseband signals received from the baseband processor 122 and transmits RF signals through the antenna 118. The baseband processor 122 processes the baseband signals transmitted/received between the RF module 120 and the controller 100. For example, in the case of data transmission, the baseband processor 122 performs a channel coding and a spreading with respect to transmit (TX) data. In the case of data reception, the baseband processor 122 performs a despreading and a channel decoding with respect to receive (RX) data.

Figure 2:
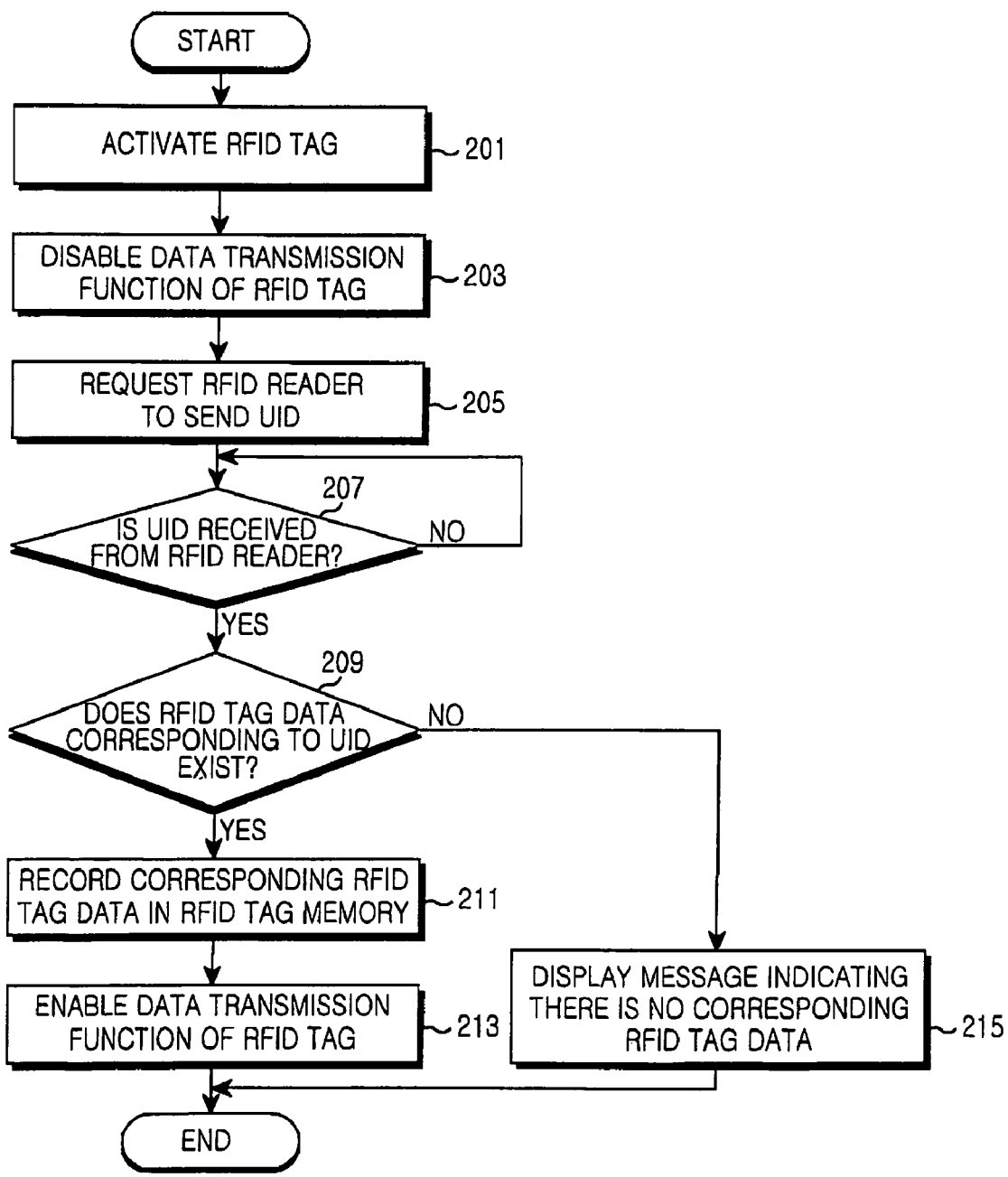
FIG. 2 illustrates a flowchart illustrating a method for modifying an RFID tag data in a portable terminal according to the present invention.

FIG. 2 is a flowchart illustrating a method for dynamically modifying the RFID tag data in the portable terminal according to the present invention.

Referring to FIG. 2, the controller 100 activates the RFID tag 124 in step 201. That is, when the RFID reader is located within a predetermined region near the portable terminal, the RFID tag 124 detects a signal generated from the RFID reader. Using the detected signal, the controller 100 determines whether the RFID tag 124 is ready to transmit the RFID tag data. In step 203, the controller 100 disables the data transmission function of the RFID tag 124. That is, because the data recorded in the RFID tag is not modified to data allowing the RFID reader to operate, the controller 100 disables the data transmission function of the RFID tag 124 by turning off an update flag, so that the RFID reader cannot collect the data.

An update flag is a flag that indicates the modified state of the data recorded in the RFID tag 124. When the update flag is off, the data transmission function of the RFID tag 124 is disabled. On the other hand, when the update flag is on, the data transmission function of the RFID tag 124 is enabled.

In step 205, the controller 100 requests the RFID reader to send its UID thereto. The UID is an identifier that allows the RFID reader to be identified. That is, the controller 100 requests the RFID reader to send its UID so as to identify the RFID reader and generate the RFID tag data corresponding to the identified RFID reader.

In step 207, the controller 100 determines whether the UID of the RFID reader is received. When the UID of the RFID reader is received, the controller 100 proceeds to step 209.

In step 209, the controller 100 determines whether an RFID tag data corresponding to the UID of the RFID reader exists in an RFID data management table using the received UID as a key data that can identify data in the RFID data management table. A user can additionally register the RFID tag data in the RFID data management table.

When the RFID tag data corresponding to the UID of the RFID reader does not exists, the controller 100 displays a message indicating that the RFID data management table has no corresponding RFID tag data in step 215. That is, the controller 100 displays a message indicating that the RFID tag allowing the RFID reader to operate cannot be generated because there is no data corresponding to the UID of the RFID reader.

When the RFID tag data corresponding to the UID of the RFID reader exists in the RFID data management table, the controller 100 records the corresponding RFID tag data in a memory of the RFID tag and generates the RFID tag allowing the RFID reader to operate in step 211.

In step 213, the controller 100 transmits the RFID tag data. That is, the disabled data transmission function of the RFID tag is enabled and the modified data of the RFID tag is transmitted to the RFID reader. Thereafter, the controller 100 terminates the process.

As described above, the data recorded in the RFID tag can be dynamically modified according to the RFID readers that are located near the portable terminal and collect the RFID tag data. Therefore, a plurality of RFID readers can be operated through even one portable terminal.

Exemplary embodiments of the present invention also include computer readable codes on a computer readable medium. The computer readable medium can be any data storage device that can store data that can be read by a computer system. Examples of a computer readable medium include magnetic storage media (such as ROM, floppy disks, hard disks, among others), optical recording media (such as CD-ROMs, or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing exemplary embodiments of the present invention can be construed by programmers of ordinary skill in the art to which the present invention pertains.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for modifying an RFID (Radio Frequency Identification) data in a portable terminal using a controller, the method comprising the steps of:

determining whether a UID (Unique Identification) of an RFID reader is received;

determining whether RFID tag data corresponding to the received UID of the RFID reader exists in an RFID data management database; and when the RFID tag data corresponding to the received UID data exists in the RFID data management database, recording the corresponding data in the RFID tag and transmitting the recorded data.

2. The method of claim 1, further comprising disabling a data transmitting function of the RFID tag when the RFID tag is activated.

3. The method of claim 1, further comprising requesting the RFID reader to send the UID to the portable terminal.

4. The method of claim 1, further comprising displaying a message indicating that it is impossible to generate the RFID tag data corresponding to the RFID reader, when no RFID tag data corresponding to the received UID exists in the RFID data management database.

5. The method of claim 1, wherein the RFID tag data management database includes the UID of the RFID reader and data allowing the RFID reader to operate.

6. The method of claim 1, wherein the RFID tag data management database is updateable by a user.

7. An apparatus for modifying an RFID (Radio Frequency Identification) tag data in a portable terminal, the apparatus comprising:

a database storing a plurality of RFID tag data corresponding to a plurality of RFID readers;

a controller for reading, from the database, an RFID tag data corresponding to a UID (Unique Identification) received from a specific RFID reader, and recording the read RFID tag data in an internal memory of an RFID tag; and an RFID tag for transmitting the recorded RFID tag data to an RFID reader under control of the controller.

8. The apparatus of claim 7, further comprising a flag for enabling and disabling the data transmission function of the RFID tag.

9. A method for managing an RFID (Radio Frequency Identification) data in a portable terminal using a controller, the method comprising the steps of:

determining whether RFID tag data corresponding to received UID (Unique Identification) of an RFID exists in an RFID data management database; and recording the corresponding data in an RFID tag and transmitting the recorded data if the RFID tag data corresponding to the received UID data exists in the RFID data management database.

10. The method of claim 9, further comprising disabling a data transmitting function of the RFID tag when the RFID tag is activated.

11. The method of claim 9, further comprising requesting the RFID reader to send the UID to the portable terminal.

12. The method of claim 9, further comprising displaying a message indicating that it is impossible to generate the RFID tag data corresponding to the RFID reader, when no RFID tag data corresponding to the received UID exists in the RFID data management database.

13. The method of claim 9, wherein the RFID tag data management database includes the UID of the RFID reader and data allowing the RFID reader to operate.

14. An apparatus for modifying an RFID (Radio Frequency Identification) tag data in a portable terminal, the apparatus comprising: a database storing a plurality of RFID tag data corresponding to a plurality of RFID readers; and a controller for reading, from the database, an RFID tag data corresponding to a UID (Unique Identification) received from a specific RFID reader, and recording the read RFID tag data in an internal memory of an RFID tag, an RFID tag for transmitting the recorded RFID tag data to the RFID reader under control of the controller.

15. The apparatus of claim 14, further comprising a flag for enabling and disabling the data transmission function of the RFID tag.

* * * * *